UNITED STATES PATENT OFFICE.

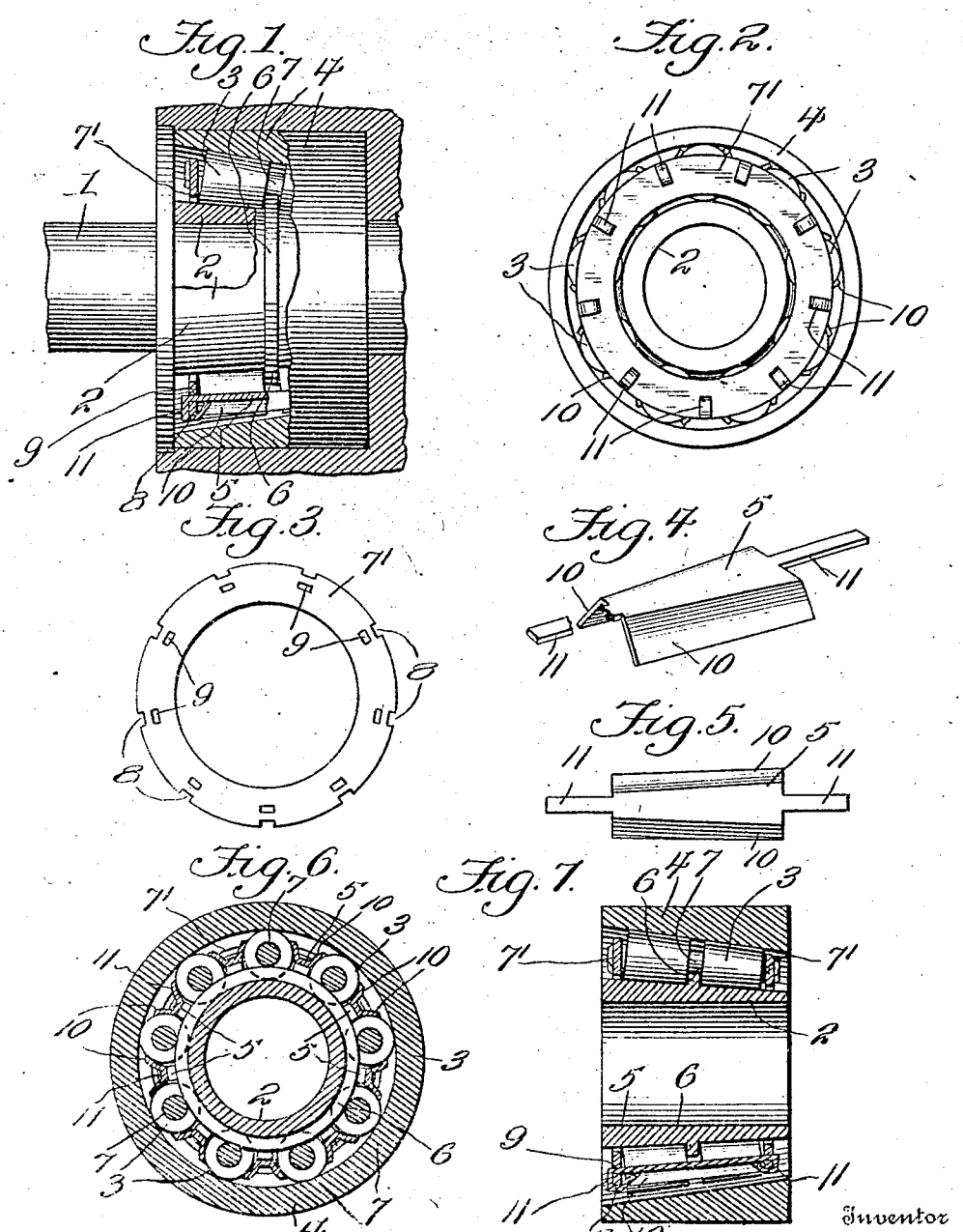

WILBUR E. LEWIS, OF DADE CITY, FLORIDA.

ROLLER-BEARING.

1,073,501.   Specification of Letters Patent.   Patented Sept. 16, 1913.

Application filed September 6, 1911. Serial No. 647,853.

*To all whom it may concern:*

Be it known that I, WILBUR E. LEWIS, a citizen of the United States, residing at Dade City, in the county of Pasco and State of Florida, have invented new and useful Improvements in Roller-Bearings, of which the following is a specification.

This invention relates to roller bearings.

One of the principal objects of the invention is to provide a bearing of this type wherein the cage is assembled from individual units which may be readily disconnected so as to make replacing worn parts a convenient and simple operation and to avoid discarding the entire cage as where these articles are made of one piece.

Another object of the invention is the provision of a bearing which extends to the end of the roller and cone where the bearing does the most good, and provides more bearing capacity. This is accomplished without making the boxing any larger or reducing the size of the spindle.

Further objects will appear as the following specific description is read in connection with the accompanying drawings, forming a part of this invention, and in which—

Figure 1 is a side elevation with a part of the boxing or cup broken away. Fig. 2 is an end elevation. Fig. 3 is an elevation of one of the cage rings. Fig. 4 is a perspective view of one of the divider or separator members. Fig. 5 is a top plan view. Fig. 6 is a transverse section through the bearing. Fig. 7 is a detail longitudinal section.

Referring more particularly to the drawings, 1 represents a spindle which may be straight and upon which is secured a cone 2 having a tapered outer surface upon which the rollers 3 of the bearings are adapted to rest. These rollers lie between the cone 2 and the boxing or cup 4 and are held in separated relation, as will be hereinafter described, by the dividers or separators 5. The cone is provided with a central annular rib 6 and each roller is provided with a corresponding groove 7 which receives the rib and prevents endwise movement of the rollers with relation to the spindle. The cage is constructed of a pair of rings 7' having a plurality of notches 8 arranged around their peripheries and a plurality of slots 9 radially in line with the notches for a purpose which will hereinafter be described. The dividers or separators consist of separate plates having diverging wings 10 and longitudinally extending tongues 11. These tongues are adapted to pass through the slots 9 and are sufficiently malleable to be bent into the notches 8 so as to hold the dividers in proper position. When all of the dividers are in position and the rollers positioned therebetween, the cage can have no endwise movement relative to the spindle and no rotary movement independent of the rollers themselves.

It will be noticed that the diverging wings 10 lie over or partially over adjoining rollers so that when the boxing is removed from the bearing, the rollers will be held in place on the cone and can not be displaced therefrom without removing one of the dividers or separators. It will also be noticed that when one of the dividers becomes worn it may be conveniently removed by opening its tongue 11 sufficiently to disconnect it from the notches 8 and the slots 9.

Having thus described the invention, what I claim as new is:—

A roller bearing comprising a cone having a central annular rib, a plurality of tapered rollers having central annular grooves to receive the ribs, a cup having a tapered bore fitting the rollers, rings mounted at opposite ends of the rollers within the bore and having slots and radially alined notches, separator members having diverging roller retaining wings, and malleable tongues carried by said members and passing through the slots and engaged in the notches to connect the rings and to hold the separators between the same, said tongues coacting with the walls of the notches to prevent the separators from turning.

In testimony whereof I affix my signature in presence of two witnesses.

WILBUR E. LEWIS.

Witnesses:
E. P. WILSON,
JASPER C. CARTER.